(12) United States Patent
Imagawa et al.

(10) Patent No.: US 12,442,574 B2
(45) Date of Patent: Oct. 14, 2025

(54) VAPOR COMPRESSION REFRIGERATION CYCLE DEVICE

(71) Applicant: Panasonic Intellectual Property Management Co., Ltd., Kadoma (JP)

(72) Inventors: Tsuneko Imagawa, Osaka (JP); Yuki Yamaoka, Shiga (JP); Yasuaki Bando, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 150 days.

(21) Appl. No.: 18/482,566

(22) Filed: Oct. 6, 2023

(65) Prior Publication Data

US 2024/0175615 A1 May 30, 2024

(30) Foreign Application Priority Data

Nov. 29, 2022 (JP) .................................. 2022-190326

(51) Int. Cl.
*F25B 49/02* (2006.01)
*F25B 1/04* (2006.01)

(52) U.S. Cl.
CPC .............. *F25B 49/022* (2013.01); *F25B 1/04* (2013.01); *F25B 2400/0409* (2013.01);
(Continued)

(58) Field of Classification Search
CPC .. F25B 49/022; F25B 1/04; F25B 2400/0409; F25B 2600/0253; F25B 2600/2501; F25B 2600/2513
See application file for complete search history.

(56) References Cited

U.S. PATENT DOCUMENTS

2008/0236184 A1* 10/2008 Morozumi ................ F25B 1/10
62/468
2015/0082814 A1* 3/2015 Kim ..................... B60H 1/3216
62/56

FOREIGN PATENT DOCUMENTS

EP 2535674 A2 12/2012
EP 2924369 A1 9/2015
(Continued)

OTHER PUBLICATIONS

Koyama, Refrigerating Cycle Device and Heat Pump Type Water Heater, Jan. 17, 2008, JP2008008499A, Whole Document (Year: 2008).*

(Continued)

*Primary Examiner* — Larry L Furdge
(74) *Attorney, Agent, or Firm* — HSML P.C.

(57) ABSTRACT

A vapor compression refrigeration cycle device includes a main refrigerant circuit formed by sequentially connecting a compressor, a use-side heat exchanger, an intermediate heat exchanger, a first expansion device, and a heat source-side heat exchanger to one another through a refrigerant pipe; a bypass refrigerant circuit which branches off from the refrigerant pipe located between the use-side heat exchanger and the first expansion device, and which is formed by sequentially connecting a second expansion device, the intermediate heat exchanger, and a compression midstream of the compressor; and a controller. When a pressure ratio of discharge pressure of refrigerant discharged from the compressor and suction pressure of refrigerant sucked into the compressor is equal to or smaller than a reference pressure ratio, the controller is configured to control the compressor such that the number of rotations of the compressor is increased.

6 Claims, 8 Drawing Sheets

(52) U.S. Cl.
CPC .............. *F25B 2600/0253* (2013.01); *F25B 2600/2501* (2013.01); *F25B 2600/2513* (2013.01)

(56) References Cited

FOREIGN PATENT DOCUMENTS

| | | | |
|---|---|---|---|
| EP | 3730875 | A1 | 10/2020 |
| JP | 2008008499 | A * | 1/2008 |
| JP | 2014190632 | A * | 10/2014 |
| WO | 2022/201361 | A1 | 9/2022 |

OTHER PUBLICATIONS

Yokozeki et al., Air Conditioner and Air Conditioner Operation Method, Oct. 6, 2014, JP2014190632A, Whole Document (Year: 2014).*

Ueda et al., Heat Pump Device, Sep. 21, 2022, JP2022136893A, Whole Document (Year: 2022).*

Extended European Search Report, European Patent Application No. 23212256.4, May 13, 2024 (9 pages).

* cited by examiner

[Fig. 1]
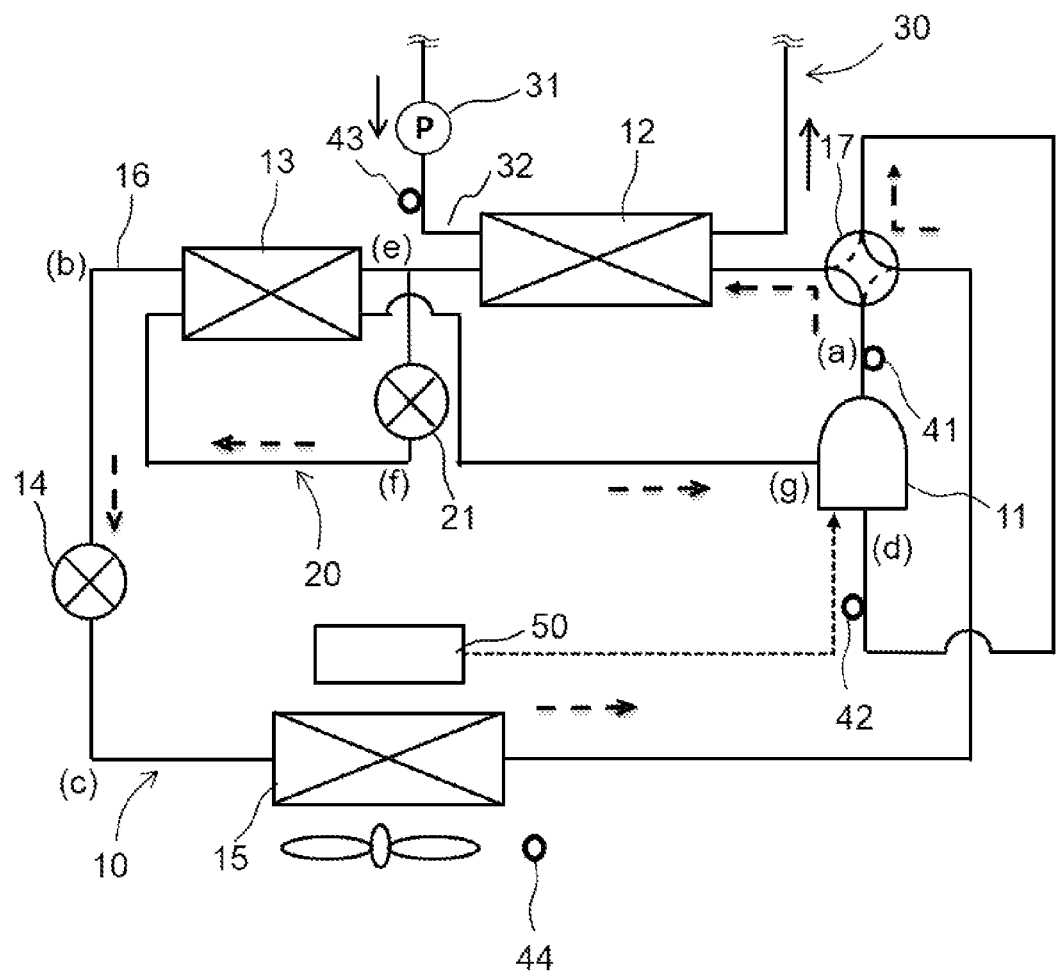

[Figs. 2]
(a)
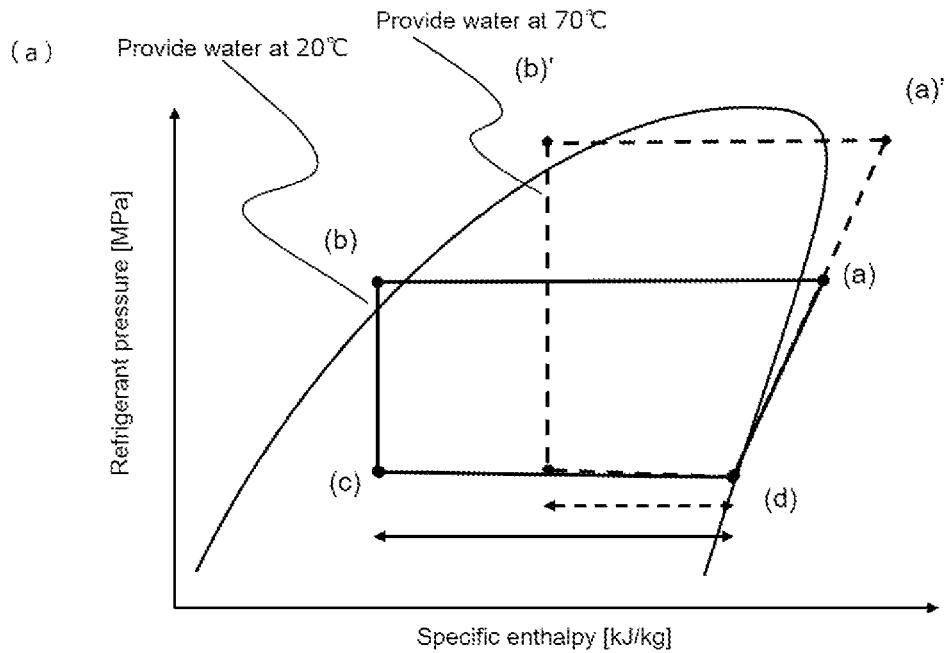
(b)
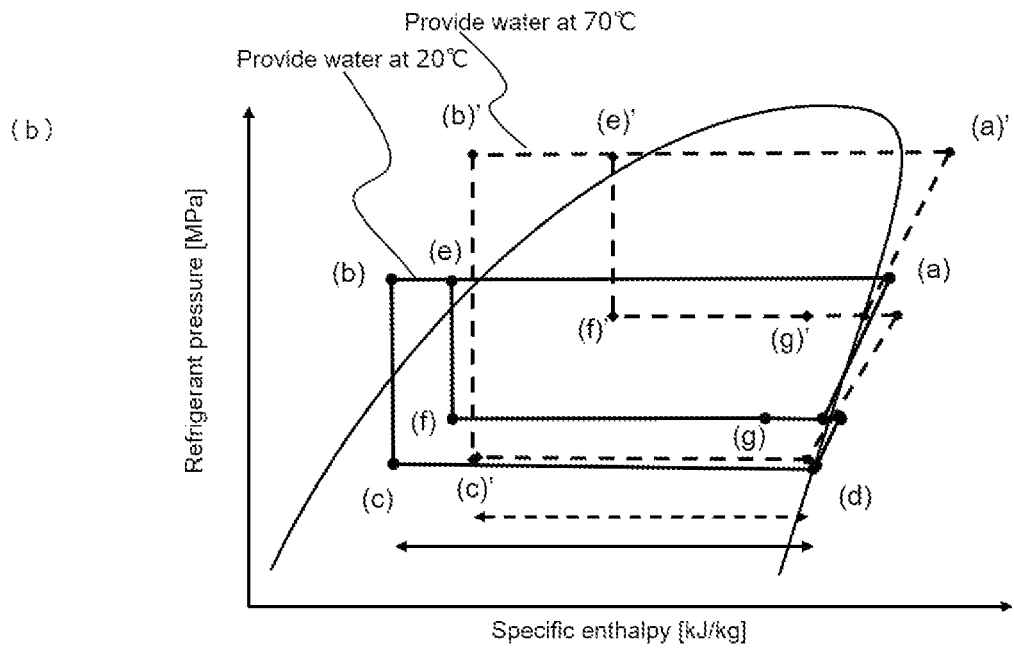

[Fig. 3]
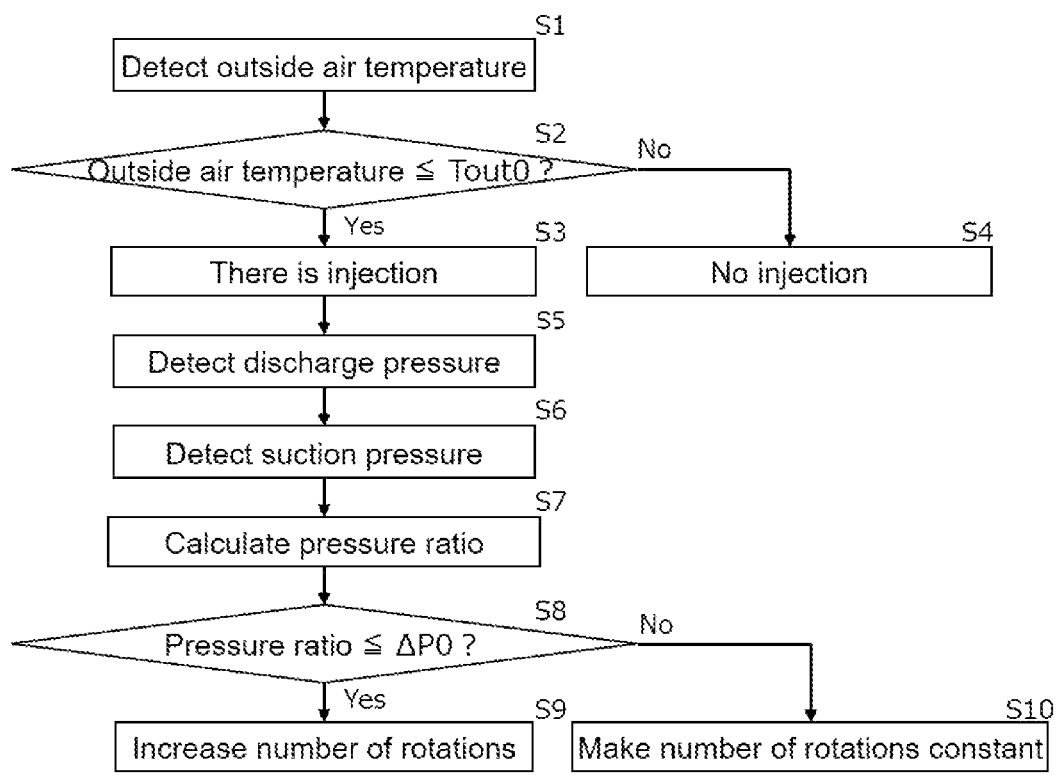

[Fig. 4]

|  |  | Outside air temperature Tout | | | | | |
|---|---|---|---|---|---|---|---|
|  |  | Tout3 | Tout2 | Tout1 | Tout0 | Tout-1 | Tout-2 |
| Pressure ratio between discharge pressure and suction pressure | ΔP 6 | 96 | 83 | 69 | 42 | 37 | 27 |
| | ΔP 5 | 92 | 81 | 68 | 43 | 38 | 27 |
| | ΔP 4 | 89 | 79 | 68 | 44 | 39 | 27 |
| | ΔP 3 | 86 | 77 | 67 | 45 | 40 | 27 |
| | ΔP 2 | 83 | 75 | 67 | 46 | 41 | 27 |
| | ΔP 1 | 80 | 73 | 67 | 47 | 43 | 27 |
| | ΔP 0 | 76 | 71 | 66 | 48 | 44 | 27 |
| | ΔP -1 | 76 | 71 | 66 | 48 | 44 | 27 |
| | ΔP -2 | 76 | 71 | 66 | 48 | 44 | 27 |

Tout-2 > Tout-1 > Tout0 > Tout1 > Tout2 > Tout3

ΔP-2 > ΔP-1 > ΔP0 > ΔP1 > ΔP2 > ΔP3 > ΔP4 > ΔP5 > ΔP6

[Fig. 5]
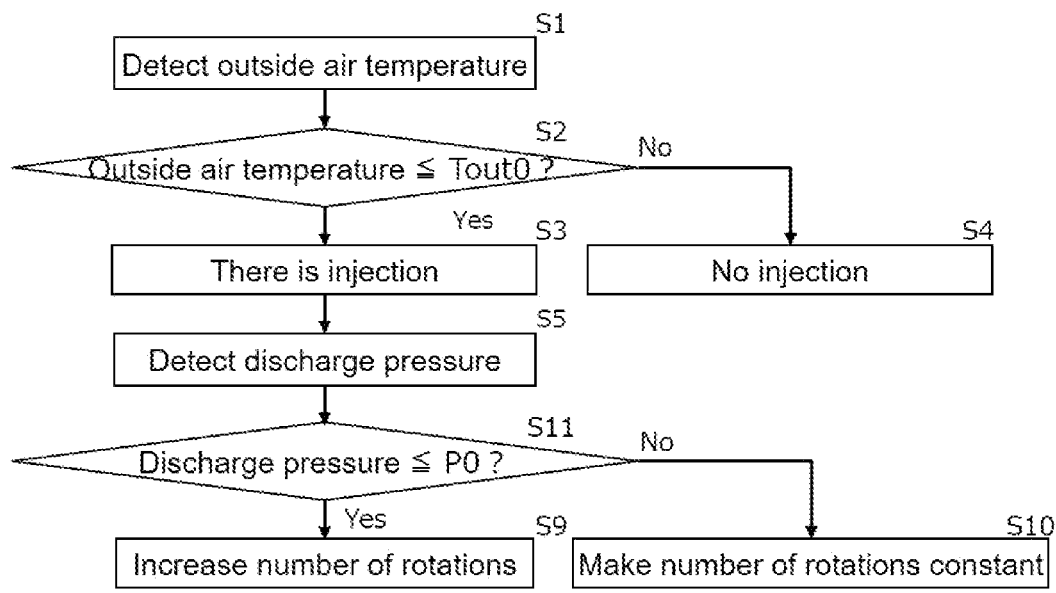

[Fig. 6]

| | | Outside air temperature Tout | | | | | |
|---|---|---|---|---|---|---|---|
| | | Tout3 | Tout2 | Tout1 | Tout0 | Tout-1 | Tout-2 |
| Discharge pressure | P 6 | 96 | 83 | 69 | 42 | 37 | 27 |
| | P 5 | 92 | 81 | 68 | 43 | 38 | 27 |
| | P 4 | 89 | 79 | 68 | 44 | 39 | 27 |
| | P 3 | 86 | 77 | 67 | 45 | 40 | 27 |
| | P 2 | 83 | 75 | 67 | 46 | 41 | 27 |
| | P 1 | 80 | 73 | 67 | 47 | 43 | 27 |
| | P 0 | 76 | 71 | 66 | 48 | 44 | 27 |
| | P -1 | 76 | 71 | 66 | 48 | 44 | 27 |
| | P -2 | 76 | 71 | 66 | 48 | 44 | 27 |

Tout-2 > Tout-1 > Tout0 > Tout1 > Tout2 > Tout3
P-2 > P-1 > P0 > P1 > P2 > P3 > P4 > P5 > P6

[Fig. 7]
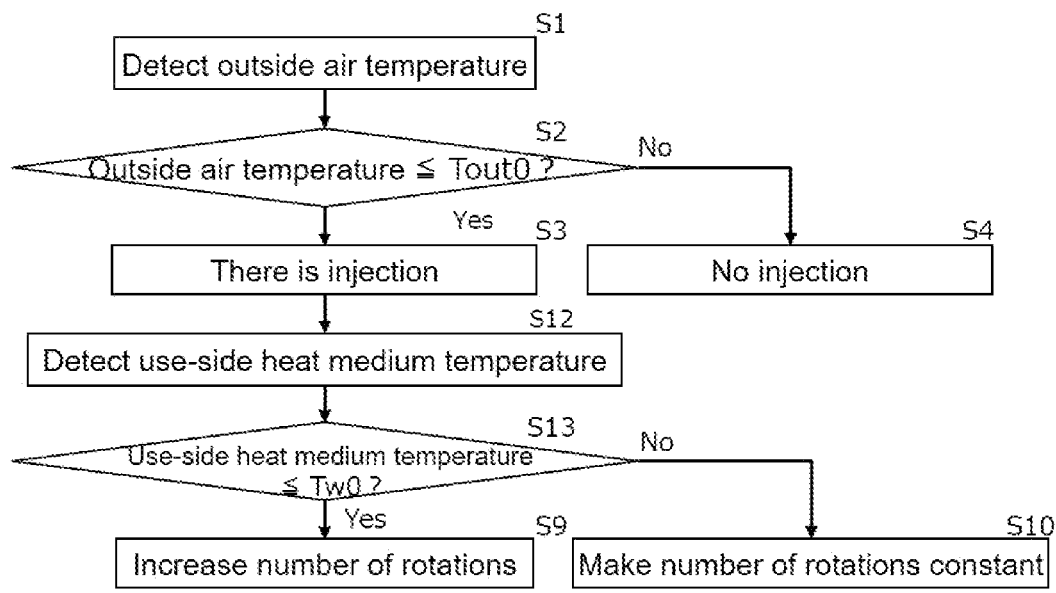

[Fig. 8]

| | | Outside air temperature Tout | | | | | |
|---|---|---|---|---|---|---|---|
| | | Tout3 | Tout2 | Tout1 | Tout0 | Tout-1 | Tout-2 |
| Use-side heat medium temperature | T w 6 | 96 | 83 | 69 | 42 | 37 | 27 |
| | T w 5 | 92 | 81 | 68 | 43 | 38 | 27 |
| | T w 4 | 89 | 79 | 68 | 44 | 39 | 27 |
| | T w 3 | 86 | 77 | 67 | 45 | 40 | 27 |
| | T w 2 | 83 | 75 | 67 | 46 | 41 | 27 |
| | T w 1 | 80 | 73 | 67 | 47 | 43 | 27 |
| | T w 0 | 76 | 71 | 66 | 48 | 44 | 27 |
| | T w − 1 | 76 | 71 | 66 | 48 | 44 | 27 |
| | T w − 2 | 76 | 71 | 66 | 48 | 44 | 27 |

Tout-2 > Tout-1 > Tout0 > Tout1 > Tout2 > Tout3

T w -2 > T w -1 > T w 0 > T w 1 > T w 2 > T w 3 > T w 4 > T w 5 > T w 6

VAPOR COMPRESSION REFRIGERATION CYCLE DEVICE

TECHNICAL FIELD

The present invention relates to a vapor compression refrigeration cycle device.

TECHNICAL FIELD

Patent document 1 proposes an air conditioner which calculate target discharge superheat based on frequency and a high and low pressure ratio of a compressor when outside air temperature becomes equal to or lower than predetermined temperature, and which controls an injection amount such that the air conditioner becomes equal to the target discharge superheat, and when the high and low pressure ratio of the compressor is small, an expansion valve is controlled such that the target discharge superheat becomes small, thereby enhancing efficiency.

PRIOR ART DOCUMENT

Patent Document

[Patent Document 1] EPC Patent Application Publication No.3730875

SUMMARY OF THE INVENTION

Problem to be Solved by the Invention

However, the high and low pressure difference of the compressor is small, the injection amount becomes small, and if the injection amount becomes small, necessary heating ability cannot be obtained.

It is an object of the present invention to provide a vapor compression refrigeration cycle device capable of obtaining necessary heating ability when the injection amount becomes small.

Means for Solving the Problem

A vapor compression refrigeration cycle device described in a first aspect includes: a main refrigerant circuit 10 formed by sequentially connecting a compressor 11, a use-side heat exchanger 12, an intermediate heat exchanger 13, a first expansion device 14 and a heat source-side heat exchanger 15 to one another through a refrigerant pipe 16; a bypass refrigerant circuit 20 which branches off from the refrigerant pipe 16 located between the use-side heat exchanger 12 and the first expansion device 14, and which is formed by sequentially connecting by sequentially connecting a second expansion device 21, the intermediate heat exchanger 13 and a compression midstream of the compressor 11 to one another; and a control device 50 for controlling valve opening degrees of the first expansion device 14 and the second expansion device 21; wherein when a pressure ratio of discharge pressure of refrigerant discharged from the compressor 11 and suction pressure of refrigerant sucked into the compressor 11 is equal to or smaller than a reference pressure ratio, the control device 50 controls the compressor 11 such that number of rotations of the compressor 11 is increased.

According to the invention described in a second aspect, in the vapor compression refrigeration cycle device described in the first aspect, the reference pressure ratio includes at least a first reference pressure ratio and a second reference pressure ratio which is smaller than the first reference pressure ratio, and the number of rotations of the compressor 11 at the second reference pressure ratio is larger than the number of rotations of the compressor 11 at the first reference pressure ratio.

A vapor compression refrigeration cycle device described in a third aspect includes: a main refrigerant circuit 10 formed by sequentially connecting a compressor 11, a use-side heat exchanger 12, an intermediate heat exchanger 13, a first expansion device 14 and a heat source-side heat exchanger 15 to one another through a refrigerant pipe 16; a bypass refrigerant circuit 20 which branches off from the refrigerant pipe 16 between the use-side heat exchanger 12 and the first expansion device 14, and which is formed such that the bypass refrigerant circuit 20 is sequentially connected to middle of a compression stroke of each of the second expansion device 21, the intermediate heat exchanger 13 and the compressor 11; and a control device 50 for controlling valve opening degrees of the first expansion device 14 and the second expansion device 21; wherein when discharge pressure of refrigerant discharged from the compressor 11 is equal to or smaller than reference pressure, the control device 50 controls the compressor 11 such that number of rotations of the compressor 11 is increased.

According to the invention described in a fourth aspect, in the vapor compression refrigeration cycle device described in the third aspect, the reference pressure includes at least first reference pressure and second reference pressure which is smaller than the first reference pressure, and the number of rotations of the compressor 11 under the second reference pressure is larger than the number of rotations of the compressor 11 under the first reference pressure.

A vapor compression refrigeration cycle device described in a fifth aspect includes: a main refrigerant circuit 10 formed by sequentially connecting a compressor 11, a use-side heat exchanger 12, an intermediate heat exchanger 13, a first expansion device 14 and a heat source-side heat exchanger 15 to one another through a refrigerant pipe 16; a bypass refrigerant circuit 20 which branches off from the refrigerant pipe 16 between the use-side heat exchanger 12 and the first expansion device 14, and which is formed such that the bypass refrigerant circuit 20 is sequentially connected to middle of a compression stroke of each of the second expansion device 21, the intermediate heat exchanger 13 and the compressor 11; a control device 50 for controlling valve opening degrees of the first expansion device 14 and the second expansion device 21; and a before-heating temperature sensor 43 for detecting use-side heat medium temperature at an entrance of the use-side heat exchanger 12; wherein when the use-side heat medium temperature detected by the before-heating temperature sensor 43 is equal to or smaller than reference temperature, the control device 50 controls the compressor 11 such that number of rotations of the compressor 11 is increased.

According to the invention described in a sixth aspect, in the vapor compression refrigeration cycle device described in the fifth aspect, the reference temperature includes at least first reference temperature and second reference temperature which is smaller than the first reference temperature, and the number of rotations of the compressor 11 at the second reference temperature is larger than the number of rotations of the compressor 11 at the first reference temperature.

Effect of the Invention

According to the present invention, the fact that the injection amount becomes small is determined from a pressure ratio between discharge pressure and suction pressure, and if the pressure ratio is equal to or smaller than a reference pressure ratio, necessary heating ability can be obtained by increasing the number of rotations of the compressor.

According to the invention, the fact that the injection amount becomes small is determined from the discharge pressure, and if the discharge pressure is equal to or smaller than reference pressure, necessary heating ability can be obtained by increasing the number of rotations of the compressor.

Further, according to the invention, the fact that the injection amount becomes small is determined from use-side heat medium temperature, and if the use-side heat medium temperature is equal to or lower than reference temperature, necessary heating ability can be obtained by increasing the number of rotations of the compressor.

BRIEF DESCRIPTION OF THE DRAWINGS

FIG. 1 is a configuration diagram of a vapor compression refrigeration cycle device according to an embodiment of the present invention;

FIG. 2 are pressure-enthalpy diagrams in the vapor compression refrigeration cycle device;

FIG. 3 is a control flowchart performed by a pressure ratio between discharge pressure and suction pressure in the vapor compression refrigeration cycle device;

FIG. 4 is a diagram specifically showing control performed by the pressure ratio between the discharge pressure and suction pressure of refrigerant;

FIG. 5 is a control flowchart performed by the discharge pressure of refrigerant in the vapor compression refrigeration cycle device;

FIG. 6 is a diagram further specifically showing control performed by discharge pressure of refrigerant;

FIG. 7 is a control flowchart performed by use-side heat medium temperature in the vapor compression refrigeration cycle device; and FIG. 8 is a diagram further specifically showing control performed by the use-side heat medium temperature of refrigerant.

MODE FOR CARRYING OUT THE INVENTION

In a vapor compression refrigeration cycle device of a first embodiment, when a pressure ratio of discharge pressure of refrigerant discharged from the compressor and suction pressure of refrigerant sucked into the compressor is equal to or smaller than a reference pressure ratio, the control device controls the compressor such that number of rotations of the compressor is increased. According to this embodiment, the fact that the injection amount becomes small is determined from a pressure ratio between discharge pressure and suction pressure, and if the pressure ratio is equal to or smaller than reference pressure, necessary heating ability can be obtained by increasing the number of rotations of the compressor.

According to a second embodiment of the invention, in the vapor compression refrigeration cycle device of the first embodiment, the reference pressure ratio includes at least a first reference pressure ratio and a second reference pressure ratio which is smaller than the first reference pressure ratio, and the number of rotations of the compressor at the second reference pressure ratio is larger than the number of rotations of the compressor at the first reference pressure ratio. According to this embodiment, necessary heating ability can be maintained by increasing the number of rotations of the compressor in accordance with a compression ratio.

In a vapor compression refrigeration cycle device of a third embodiment of the invention, when discharge pressure of refrigerant discharged from the compressor is equal to or smaller than reference pressure, the control device controls the compressor such that number of rotations of the compressor is increased. According to this embodiment, the fact that the injection amount becomes small is determined from discharge pressure, and if the discharge pressure is equal to or smaller than the reference pressure, necessary heating ability can be obtained by increasing the number of rotations of the compressor.

According to a fourth embodiment of the invention, in the vapor compression refrigeration cycle device of the third embodiment, the reference pressure includes at least first reference pressure and second reference pressure which is smaller than the first reference pressure, and the number of rotations of the compressor under the second reference pressure is larger than the number of rotations of the compressor under the first reference pressure. According to this embodiment, necessary heating ability can be maintained by increasing the number of rotations of the compressor in accordance with discharge pressure.

In a vapor compression refrigeration cycle device of a fifth embodiment of the invention, when the use-side heat medium temperature detected by the before-heating temperature sensor is equal to or smaller than reference temperature, the control device controls the compressor such that number of rotations of the compressor is increased. According to this embodiment, the fact that the injection amount becomes small is determined from the use-side heat medium temperature, and if the use-side heat medium temperature is equal to or smaller than the reference temperature, necessary heating ability can be obtained by increasing the number of rotations of the compressor.

According to a sixth embodiment of the invention, in the vapor compression refrigeration cycle device of the fifth embodiment, the reference temperature includes at least first reference temperature and second reference temperature which is smaller than the first reference temperature, and the number of rotations of the compressor at the second reference temperature is larger than the number of rotations of the compressor at the first reference temperature. According to this embodiment, necessary heating ability can be maintained by increasing the number of rotations of the compressor in accordance with the use-side heat medium temperature.

EMBODIMENT

An embodiment of the present invention will be described below with reference to the drawings.

FIG. 1 is a configuration diagram of a vapor compression refrigeration cycle device according to the embodiment. The vapor compression refrigeration cycle device is composed of a main refrigerant circuit 10 and a bypass refrigerant circuit 20.

The main refrigerant circuit 10 is formed by sequentially connecting, to one another through a refrigerant pipe 16, a compressor 11 which compresses refrigerant, a use-side heat exchanger 12 which functions as a radiator, an intermediate heat exchanger 13 which functions as an economizer, a first expansion device 14 which is a main expansion valve, and a heat source-side heat exchanger 15 which functions as an evaporator.

As shown in the drawing, the vapor compression refrigeration cycle device may have a four-way valve 17 between the compressor 11 and the use-side heat exchanger 12. The four-way valve 17 can change a direction of refrigerant which flows through the main refrigerant circuit 10. That is, refrigerant which is discharged from the compressor 11 flows through the heat source-side heat exchanger 15, the first expansion device 14, the intermediate heat exchanger 13 and the use-side heat exchanger 12 in this order by switching the four-way valve 17, and the refrigerant is sucked into the compressor 11. In this case, the heat source-side heat exchanger 15 functions as a radiator and the use-side heat exchanger 12 functions as an evaporator.

The bypass refrigerant circuit 20 branches off from the refrigerant pipe 16 between the use-side heat exchanger 12 and the first expansion device 14, and the bypass refrigerant circuit 20 is connected to a compression chamber which is located in the middle of a compression stroke of the compressor 11.

The bypass refrigerant circuit 20 is provided with a second expansion device 21. Partial high pressure refrigerant after it passes through the use-side heat exchanger 12, or partial high pressure refrigerant after it passes through the intermediate heat exchanger 13 is decompressed by the second expansion device 21 and becomes intermediate pressure refrigerant and thereafter, heat of the intermediate pressure refrigerant is exchanged, by the intermediate heat exchanger 13, with heat of high pressure refrigerant which flows through the main refrigerant circuit 10, and the refrigerant is injected into the compressor 11. The refrigerant injected into the compressor 11 joins up with refrigerant which is in the middle of a compression stroke of the compressor 11.

In the compressor 11, the injected refrigerant and the refrigerant which is in the middle of the compression stroke join up with each other and they are again compressed.

A use-side heat medium circuit 30 is formed by connecting the use-side heat exchanger 12, a transportation pump 31, a heating terminal (not shown) and a hot water tank (not shown) to one another through a heat medium pipe 32. Water or antifreeze liquid can be used as the heat medium which flows through the use-side heat medium circuit 30.

The use-side heat exchanger 12 heats use-side heat medium by refrigerant which is discharged from the compressor 11.

The use-side heat medium which is heated by the use-side heat exchanger 12 radiates heat in the heating terminal, the heat is utilized for air heating, the use-side heat medium which radiates heat in the heating terminal and which becomes low temperature heat medium is again heated by the use-side heat exchanger 12.

The use-side heat medium heated by the use-side heat exchanger 12 is introduced into the hot water tank from an upper portion of the hot water tank, the low temperature use-side heat medium comes out from a lower portion of the hot water tank, and the use-side heat medium is heated by the use-side heat exchanger 12.

The refrigerant pipe 16 on a discharge side of the compressor 11 is provided with refrigerant discharge pressure detecting means 41. The refrigerant discharge pressure detecting means 41 detects discharge pressure of refrigerant which is discharged from the compressor 11.

The refrigerant pipe 16 on a suction side of the compressor 11 is provided with refrigerant suction pressure detecting means 42. The refrigerant suction pressure detecting means 42 detects suction pressure of refrigerant which is sucked into the compressor 11.

The heat medium pipe 32 on an entrance side of the use-side heat exchanger 12 is provided with a before-heating temperature sensor 43. The before-heating temperature sensor 43 detects use-side heat medium temperature at an entrance of the use-side heat exchanger 12.

The vapor compression refrigeration cycle device of the embodiment includes an outside air temperature detecting sensor 44 for detecting outside air temperature, and a control device 50 for controlling the number of rotations of the compressor 11.

Operation of the vapor compression refrigeration cycle device will be described using FIGS. 1 and 2.

FIG. 2 are pressure-enthalpy diagrams (P-h diagrams) in the vapor compression refrigeration cycle device of the embodiment, wherein FIG. 2(a) shows a case where there is no injection, and FIG. 2(b) shows a case where there is injection. Points (a) to (g) in FIG. 2 correspond to points (a) to (g) shown in FIG. 1.

First, high pressure refrigerant (a) discharged from the compressor 11 radiates heat in the use-side heat exchanger 12 and thereafter, the high pressure refrigerant (a) branches off (e) from the main refrigerant circuit 10, the high pressure refrigerant (a) is decompressed to intermediate pressure by the second expansion device 21 and becomes intermediate pressure refrigerant (f), and the intermediate pressure refrigerant (f) exchanges heat in the intermediate heat exchanger 13.

The high pressure refrigerant which flows through the main refrigerant circuit 10 after it radiates heat in the use-side heat exchanger 12 is cooled by the intermediate pressure refrigerant (f) which flows through the bypass refrigerant circuit 20, and the high pressure refrigerant is decompressed (c) by the first expansion device 14 in a state where enthalpy is reduced (b).

Dryness (weight rate occupied by gas phase component in entire refrigerant) of refrigerant (c) which is decompressed in the first expansion device 14 when the refrigerant (c) flows into the heat source-side heat exchanger 15 is lowered, liquid component of the refrigerant is increased, the refrigerant evaporates in the heat source-side heat exchanger 15, and the refrigerant returns to a suction side (d) of the compressor 11.

On the other hand, the intermediate pressure refrigerant (f) decompressed to intermediate pressure by the second expansion device 21 is heated in the intermediate heat exchanger 13 by high pressure refrigerant which flows through the main refrigerant circuit 10, and the intermediate pressure refrigerant (f) joins up (g) with refrigerant which is in the middle of a compression stroke of the compressor 11 in a state where refrigerant enthalpy becomes high.

As shown in FIGS. 2(a) and (b), the higher the water-going temperature becomes, it is necessary to increase the exit temperature of the compressor. Therefore, the high pressure rises.

When there is no injection, as shown in FIG. 2(a), the higher the high pressure rises, an enthalpy difference in a two phase region becomes small, and an endothermic energy amount is reduced. Therefore, to obtain the same heating ability when water-going temperature becomes high, it is necessary to increase frequency.

However, when there is injection, if the higher the water-going temperature rises and operation to increase the injection amount is carried out, the refrigerant circulation amount is increased, optimal efficiency can be obtained and large heating ability can also be obtained. Therefore, the number of rotations of the compressor 11 can be reduced. This is because, as shown in FIG. 2(b), if high pressure is high, intermediate pressure also becomes high, and density of the intermediate pressure refrigerant becomes large, a refrigerant amount which is injected to the compressor 11 is increased, and the refrigerant circulation amount of the refrigeration cycle can be increased.

Further, if the high pressure becomes high, a temperature difference between the high pressure refrigerant and the intermediate pressure refrigerant of the intermediate heat exchanger 13 becomes large (not shown). Therefore, a temperature difference between an entrance (e') and an exit (b') of the high pressure refrigerant of the intermediate heat exchanger 13 becomes large, and a reduction degree of the exit temperature in the intermediate heat exchanger 13 can be increased. This is also because, a reduction degree of the enthalpy difference can be reduced.

FIG. 3 is a control flowchart performed by a pressure ratio between discharge pressure and suction pressure in the vapor compression refrigeration cycle device of the embodiment.

The control device 50 obtains outside air temperature Tout detected by the outside air temperature detecting sensor 44 (S1), and compares the outside air temperature Tout and outside air reference temperature Tout0 (S2).

If the outside air temperature Tout is equal to or smaller than the outside air reference temperature Tout0 (Yes in S2), to carry out the injection, the control device 50 opens the second expansion device 21 (S3).

If the outside air temperature Tout is higher than the outside air reference temperature Tout0 (No in S2), the control device 50 closes the second expansion device 21 and does not carry out the injection (S4).

The control device 50 obtains discharge pressure of refrigerant detected by the refrigerant discharge pressure detecting means 41 (S5), obtains suction pressure of refrigerant detected by the refrigerant suction pressure detecting means 42 (S6), and calculates a pressure ratio from the obtained discharge pressure and suction pressure (S7).

Then, the control device 50 compares the calculated pressure ratio and the reference pressure ratio $\Delta P0$ (S8).

If the calculated pressure ratio is equal to or smaller than the reference pressure ratio $\Delta P0$ (Yes in S8), the control device 50 increases the number of rotations of the compressor 11 (S9), and if the calculated pressure ratio is larger than the reference pressure ratio $\Delta P0$ (No in S8), the control device 50 constantly maintains the number of rotations of the compressor 11 (S10).

As described above, when the pressure ratio between discharge pressure of refrigerant discharged from the compressor 11 and suction pressure of refrigerant sucked into the compressor 11 is equal to or smaller than the reference pressure ratio $\Delta P0$, the control device 50 controls the compressor 11 such that the number of rotations of the compressor 11 is increased, and the control device 50 determines, from the pressure ratio between the discharge pressure and the suction pressure, that the injection amount becomes small, and if the pressure ratio is equal to or smaller than the reference pressure ratio $\Delta P0$, necessary heating ability can be obtained by increasing the number of rotations of the compressor 11.

FIG. 4 is a diagram specifically showing control performed by the pressure ratio between the discharge pressure and suction pressure of refrigerant. Numbers in FIG. 4 show frequencies (Hz) for rotating the compressor 11.

The outside air temperature Tout has a relation of Tout-2>Tout-1>Tout0>Tout1>Tout2>Tout3, and when the outside air temperature Tout is equal to or smaller than outside air reference temperature Tout0, the injection is carried out.

A set pressure ratio $\Delta P$ has a relation of $\Delta P-2 > \Delta P-1 > \Delta P0 > \Delta P1 > \Delta P2 > \Delta P3 > \Delta P4 > \Delta P5 > \Delta P6$, and when the pressure ratio $\Delta P$ is equal to or smaller than reference pressure ratio $\Delta P0$, the number of rotations of the compressor 11 is increased.

FIG. 4 has a first reference pressure ratio $\Delta P1$ which is smaller the reference pressure ratio $\Delta P0$, a second reference pressure ratio $\Delta P2$ which is smaller than the first reference pressure ratio $\Delta P1$, a third reference pressure ratio $\Delta P3$ which is smaller than the second reference pressure ratio $\Delta P2$, a fourth reference pressure ratio $\Delta P4$ which is smaller than the third reference pressure ratio $\Delta P3$, a fifth reference pressure ratio $\Delta P5$ which is smaller than the fourth reference pressure ratio $\Delta P4$, and a sixth reference pressure ratio $\Delta P6$ which is smaller than the fifth reference pressure ratio $\Delta P5$.

The number of rotations of the compressor 11 at the first reference pressure ratio $\Delta P1$ is made larger than that at the reference pressure ratio $\Delta P0$, the number of rotations of the compressor 11 at the second reference pressure ratio $\Delta P2$ is made larger than that at the first reference pressure ratio $\Delta P1$, the number of rotations of the compressor 11 at the third reference pressure ratio $\Delta P3$ is made larger than that at the second reference pressure ratio $\Delta P2$, the number of rotations of the compressor 11 at the fourth reference pressure ratio $\Delta P4$ is made larger than that at the third reference pressure ratio $\Delta P3$, the number of rotations of the compressor 11 at the fifth reference pressure ratio $\Delta P5$ is made larger than that at the fourth reference pressure ratio $\Delta P4$, and the number of rotations of the compressor 11 at the sixth reference pressure ratio $\Delta P6$ is made larger than that at the fifth reference pressure ratio $\Delta P5$.

On the other hand, when the pressure ratio $\Delta P$ is larger than the reference pressure ratio $\Delta P0$, as shown as the set pressure ratios $\Delta P-1$ and $\Delta P-2$, the frequency is 66 Hz at the first outside air reference temperature Tout1, is 71 Hz at the second outside air reference temperature Tout2, and is 76 Hz at the third outside air reference temperature Tout3, and those frequencies are made the same as the number of rotations at the reference pressure ratio $\Delta P0$.

As the reference pressure ratio, there are at least the first reference pressure ratio $\Delta P1$ which is smaller than the reference pressure ratio $\Delta P0$, and the second reference pressure ratio $\Delta P2$ which is smaller than the first reference pressure ratio $\Delta P1$. The control device 50 makes the number of rotations of the compressor 11 at the second reference pressure ratio $\Delta P2$ larger than that of the compressor 11 at the first reference pressure ratio $\Delta P1$. The control device 50 increases the number of rotations of the compressor 11 in accordance with the compression ratio, thereby maintaining the necessary heating ability.

As shown in the drawings, as the reference temperature of the outside air temperature Tout, there are at least first outside air reference temperature Tout1 and second outside air reference temperature Tout 2, and it is preferable that the number of rotations of the compressor 11 at the first reference pressure ratio $\Delta P1$ by the second outside air reference temperature Tout2 is made larger than that of the compressor 11 at the first reference pressure ratio $\Delta P1$ by the first outside air reference temperature Tout1.

FIG. 5 is a control flowchart performed by the discharge pressure of refrigerant in the vapor compression refrigeration cycle device of the embodiment.

The control device 50 obtains outside air temperature Tout detected by the outside air temperature detecting sensor 44 (S1), and compares the outside air temperature Tout and the outside air reference temperature Tout0 with each other (S2).

If the outside air temperature Tout is equal to or smaller than the outside air reference temperature Tout0 (Yes in S2), the control device 50 opens the second expansion device 21 to carry out the injection (S3).

If the outside air temperature Tout is higher than the outside air reference temperature Tout0 (No in S2), the control device 50 closes the second expansion device 21 and does not carry out the injection (S4).

The control device 50 obtains discharge pressure of refrigerant detected by the refrigerant discharge pressure detecting means 41 (S5), and compares the obtained discharge pressure and the reference pressure P0 with each other (S11).

If the obtained discharge pressure is equal to or smaller than the reference pressure P0 (Yes in S11), the control device 50 increases the number of rotations of the compressor 11 (S9), and if the obtained discharge pressure is higher than the reference pressure P0 (No in S11), the control device 50 constantly maintains the number of rotations of the compressor 11 (S10).

As described above, when the discharge pressure of refrigerant discharged from the compressor 11 is equal to or smaller than the reference pressure P0, the control device 50 controls the compressor 11 such that the number of rotations thereof is increased, and the control device 50 determines, from the discharge pressure, that the injection amount becomes small, and if the discharge pressure is equal to or smaller than the reference pressure P0, necessary heating ability can be obtained by increasing the number of rotations of the compressor 11.

FIG. 6 is a diagram further specifically showing control performed by discharge pressure of refrigerant. Numbers in FIG. 6 show frequencies (Hz) for rotating the compressor 11.

The outside air temperature Tout has a relation of Tout−2>Tout−1>Tout0>Tout 1>Tout 2>Tout3, and when the outside air temperature Tout is equal to or smaller than the outside air reference temperature Tout0, the injection is carried out.

The set discharge pressure P has a relation of P-2>P-1>P0>P1>P2>P3>P4>P5>P6, and when the discharge pressure P is equal to or smaller than the reference pressure P0, the number of rotations of the compressor 11 is increased.

FIG. 6 includes first reference pressure P1 which is lower than the reference pressure P0, second reference pressure P2 which is lower than the first reference pressure P1, third reference pressure P3 which is lower than the second reference pressure P2, fourth reference pressure P4 which is lower than the third reference pressure P3, fifth reference pressure P5 which is lower than the fourth reference pressure P4, and sixth reference pressure P6 which is lower than the fifth reference pressure P5.

The number of rotations of the compressor 11 under the first reference pressure P1 is made larger than that of the compressor 11 under the reference pressure P0, the number of rotations of the compressor 11 under the second reference pressure P2 is made larger than that of the compressor 11 under the first reference pressure P1, the number of rotations of the compressor 11 under the third reference pressure P3 is made larger than that of the compressor 11 under the second reference pressure P2, the number of rotations of the compressor 11 under the fourth reference pressure P4 is made larger than that of the compressor 11 under the third reference pressure P3, the number of rotations of the compressor 11 under the fifth reference pressure P5 is made larger than that of the compressor 11 under the fourth reference pressure P4, and the number of rotations of the compressor 11 under the sixth pressure P6 is made larger than that of the compressor 11 under the fifth reference pressure P5.

On the other hand, when the discharge pressure P is larger than the reference pressure P0, as shown as set pressures P-1 and P-2, the frequency is 66 Hz at the first outside air reference temperature Tout1, is 71 Hz at the second outside air reference temperature Tout2, and is 76 Hz at the third outside air reference temperature Tout3, and those frequencies are made the same as the number of rotations under the reference pressure P0.

As the reference pressure, there are at least the first reference pressure P1 which is smaller than the reference pressure P0, and the second reference pressure P2 which is smaller than the first reference pressure P1. The control device 50 makes the number of rotations of the compressor 11 under the second reference pressure P2 larger than that of the compressor 11 under the first reference pressure P1. The control device 50 increases the number of rotations of the compressor 11 in accordance with the discharge pressure P, thereby maintaining the necessary heating ability.

As shown in the drawings, as the reference temperature of the outside air temperature Tout, there are at least first outside air reference temperature Tout1 and second outside air reference temperature Tout 2, and it is preferable that the number of rotations of the compressor 11 under the first reference pressure P1 by the second outside air reference temperature Tout2 is made larger than that of the compressor 11 under the first reference pressure P1 by the first outside air reference temperature Tout1.

FIG. 7 is a control flowchart performed by use-side heat medium temperature in the vapor compression refrigeration cycle device of the embodiment.

The control device 50 obtains outside air temperature Tout detected by the outside air temperature detecting sensor 44 (S1), and compares the outside air temperature Tout and the outside air reference temperature Tout0 with each other (S2).

If the outside air temperature Tout is equal to or smaller than the outside air reference temperature Tout0 (Yes in S2), the control device 50 opens the second expansion device 21 to carry out the injection (S3).

If the outside air temperature Tout is higher than the outside air reference temperature Tout0 (No in S2), the control device 50 closes the second expansion device 21 and does not carry out the injection (S4).

The control device 50 obtains use-side heat medium temperature detected by the before-heating temperature sensor 43 (S12), and compares the obtained use-side heat medium temperature and the reference temperature Tw0 with each other (S13).

If the obtained use-side heat medium temperature is equal to or smaller than the reference temperature Tw0 (Yes in S13), the control device 50 increases the number of rotations of the compressor 11 (S9), and if the obtained use-side heat medium temperature is higher than the reference temperature Tw0 (No in S13), the control device 50 constantly maintains the number of rotations of the compressor 11 (S10).

As described above, when the use-side heat medium temperature is equal to or smaller than the reference temperature Tw0, the control device 50 controls the compressor 11 such that the number of rotations thereof is increased, and the control device 50 determines, from the use-side heat medium temperature, that the injection amount becomes small, and if the use-side heat medium temperature is equal to or smaller than the reference temperature Tw0, necessary heating ability can be obtained by increasing the number of rotations of the compressor 11.

FIG. 8 is a diagram further specifically showing control performed by the use-side heat medium temperature of refrigerant. Numbers in FIG. 8 show frequencies (Hz) for rotating the compressor 11.

The outside air temperature Tout has a relation of Tout-2>Tout-1>Tout0>Tout 1>Tout 2>Tout3, and when the outside air temperature Tout is equal to or smaller than outside air reference temperature Tout0, the injection is carried out.

Set temperature Tw has a relation of Tw-2>Tw-1>Tw0>Tw1>Tw2>Tw3>Tw4>Tw5>Tw6, and when the set temperature Tw is equal to or smaller than the reference temperature Tw0, the number of rotations of the compressor 11 is increased.

FIG. 8 has first reference temperature Tw1 which is lower than the reference temperature Tw, second reference temperature Tw2 which is lower than the first reference temperature Tw1, third reference temperature Tw3 which is lower than the second reference temperature Tw2, fourth reference temperature Tw4 which is lower than the third reference temperature Tw3, fifth reference temperature Tw5 which is lower than the fourth reference temperature Tw4, and sixth reference temperature Tw6 which is lower than the fifth reference temperature Tw5.

The number of rotations of the compressor 11 at the first reference temperature Tw1 is made larger than that at the reference temperature Tw0, the number of rotations of the compressor 11 at the second reference temperature Tw2 is made larger than that at the first reference temperature Tw1, the number of rotations of the compressor 11 at the third reference temperature Tw3 is made larger than that at the second reference temperature Tw2, the number of rotations of the compressor 11 at the fourth reference temperature Tw4 is made larger than that at the third reference temperature Tw3, the number of rotations of the compressor 11 at the fifth reference temperature Tw5 is made larger than that at the fourth reference temperature Tw4, and the number of rotations of the compressor 11 at the sixth reference temperature Tw6 is made larger than that at the fifth reference temperature Tw5.

On the other hand, when the pressure temperature Tw is larger than the reference temperature Tw0, as shown as the set pressure ratios Tw-1 and Tw-2, the frequency is 66 Hz at the first outside air reference temperature Tout1, is 71 Hz at the second outside air reference temperature Tout2, and is 76 Hz at the third outside air reference temperature Tout3, and those frequencies are made the same as the number of rotations at the reference temperature Tw0.

As the reference temperature, there are at least the first reference temperature Tw1 which is smaller than the reference temperature Tw0, and the second reference temperature Tw2 which is smaller than the first reference temperature Tw1. The control device 50 makes the number of rotations of the compressor 11 at the second reference temperature Tw2 larger than that of the compressor 11 at the first reference temperature Tw1. The control device 50 increases the number of rotations of the compressor 11 in accordance with the use-side heat medium temperature, thereby maintaining the necessary heating ability.

As shown in the drawings, as the reference temperature of the outside air temperature Tout, there are at least first outside air reference temperature Tout1 and second outside air reference temperature Tout 2, and it is preferable that the number of rotations of the compressor 11 at the first reference temperature Tw1 by the second outside air reference temperature Tout2 is made larger than that of the compressor 11 at the first reference temperature Tw1 by the first outside air reference temperature Tout1.

INDUSTRIAL APPLICABILITY

As described above, when the injection amount is reduced, it is possible to obtain necessary heating ability by increasing the number of rotations of the compressor.

EXPLANATION OF SYMBOLS 10 main refrigerant circuit
11 compressor
12 use-side heat exchanger
13 intermediate heat exchanger
14 first expansion device
15 heat source-side heat exchanger
16 refrigerant pipe
17 four-way valve
20 bypass refrigerant circuit
21 second expansion device
30 use-side heat medium circuit
31 transportation pump
32 heat medium pipe
41 refrigerant discharge pressure detecting means
42 refrigerant suction pressure detecting means
43 before-heating temperature sensor
44 outside air temperature detecting sensor
50 control device

The invention claimed is:
1. A vapor compression refrigeration cycle device comprising:
 a main refrigerant circuit formed by sequentially connecting a compressor, a use-side heat exchanger, an intermediate heat exchanger, a first expansion valve and a heat source-side heat exchanger to one another through a refrigerant pipe;
 a bypass refrigerant circuit which branches off from the refrigerant pipe located between the use-side heat exchanger and the first expansion valve, and which is formed by sequentially connecting a second expansion valve, the intermediate heat exchanger, and a compression midstream of the compressor to one another; and
 a controller configured to control valve opening degrees of the first expansion valve and the second expansion valve; wherein
 when a pressure ratio of discharge pressure of refrigerant discharged from the compressor and suction pressure of refrigerant sucked into the compressor is equal to or smaller than a reference pressure ratio, the controller is configured to determine that an injection volume to the compression midstream of the compressor is reduced and to control the compressor such that number of rotations of the compressor is increased.

2. The vapor compression refrigeration cycle device according to claim 1, wherein the reference pressure ratio includes at least a first reference pressure ratio and a second reference pressure ratio which is smaller than the first reference pressure ratio, and the number of rotations of the compressor at the second reference pressure ratio is larger than the number of rotations of the compressor at the first reference pressure ratio.

3. A vapor compression refrigeration cycle device comprising:
 a main refrigerant circuit formed by sequentially connecting a compressor, a use-side heat exchanger, an intermediate heat exchanger, a first expansion valve and a heat source-side heat exchanger to one another through a refrigerant pipe;

a bypass refrigerant circuit which branches off from the refrigerant pipe between the use-side heat exchanger and the first expansion valve, and which is formed such that the bypass refrigerant circuit is sequentially connected to the second expansion valve, the intermediate heat exchanger, and middle of a compression stroke of the compressor; and a controller configured to control valve opening degrees of the first expansion valve and the second expansion valve; wherein when discharge pressure of refrigerant discharged from the compressor is equal to or smaller than reference pressure, the controller is configured to determine that an injection volume to the middle of the compression stroke of the compressor is reduced and to control the compressor such that number of rotations of the compressor is increased.

4. The vapor compression refrigeration cycle device according to claim 3, wherein the reference pressure includes at least first reference pressure and second reference pressure which is smaller than the first reference pressure, and the number of rotations of the compressor under the second reference pressure is larger than the number of rotations of the compressor under the first reference pressure.

5. A vapor compression refrigeration cycle device comprising:

a main refrigerant circuit formed by sequentially connecting a compressor, a use-side heat exchanger, an intermediate heat exchanger, a first expansion valve and a heat source-side heat exchanger to one another through a refrigerant pipe;

a bypass refrigerant circuit which branches off from the refrigerant pipe between the use-side heat exchanger and the first expansion valve, and which is formed such that the bypass refrigerant circuit is sequentially connected to the second expansion valve, the intermediate heat exchanger, and middle of a compression stroke of the compressor;

a controller configured to control valve opening degrees of the first expansion valve and the second expansion valve; and a before-heating temperature sensor for detecting use-side heat medium temperature at an entrance of the use-side heat exchanger; wherein when the use-side heat medium temperature detected by the before-heating temperature sensor is equal to or smaller than reference temperature, the controller is configured to determine that an injection volume to the middle of the compression stroke of the compressor is reduced and to control the compressor such that number of rotations of the compressor is increased.

6. The vapor compression refrigeration cycle device according to claim 5, wherein the reference temperature includes at least first reference temperature and second reference temperature which is smaller than the first reference temperature, and the number of rotations of the compressor at the second reference temperature is larger than the number of rotations of the compressor at the first reference temperature.

* * * * *